July 19, 1927.
J. A. DAVEY ET AL
1,636,292
POWER APPLIANCE ATTACHMENT FOR AUTOMOTIVE VEHICLES
Filed July 17, 1926  2 Sheets-Sheet 1
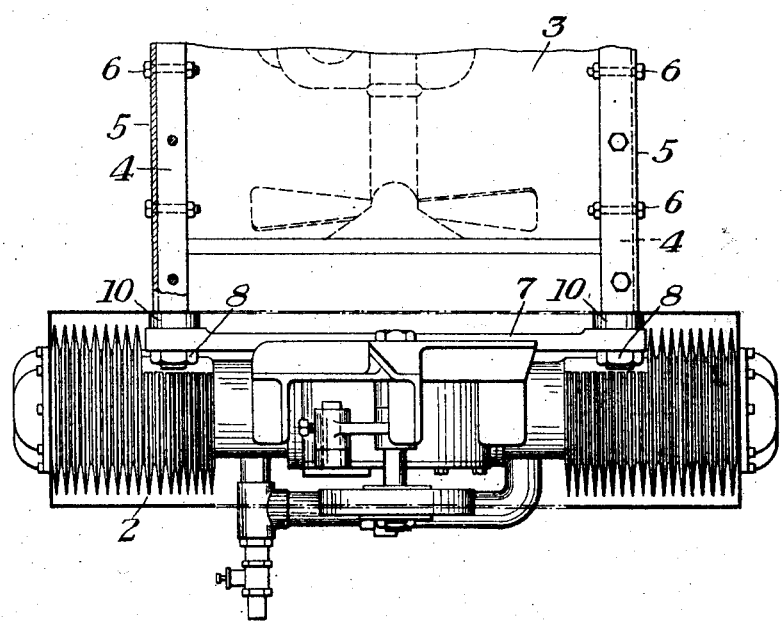
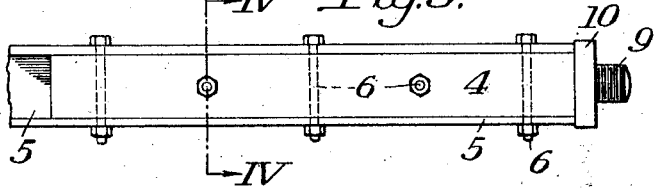 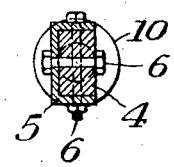
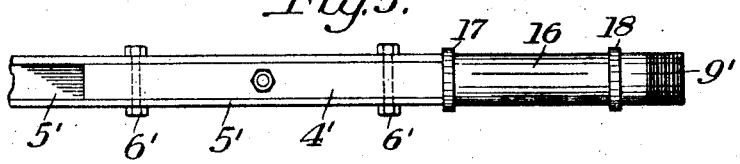
INVENTORS
James A. Davey
Paul H. Davey
Charles L. Gallagher July 19, 1927.　　　　　　　　　　　　　　　　　1,636,292
J. A. DAVEY ET AL
POWER APPLIANCE ATTACHMENT FOR AUTOMOTIVE VEHICLES
Filed July 17, 1926　　　　2 Sheets-Sheet 2
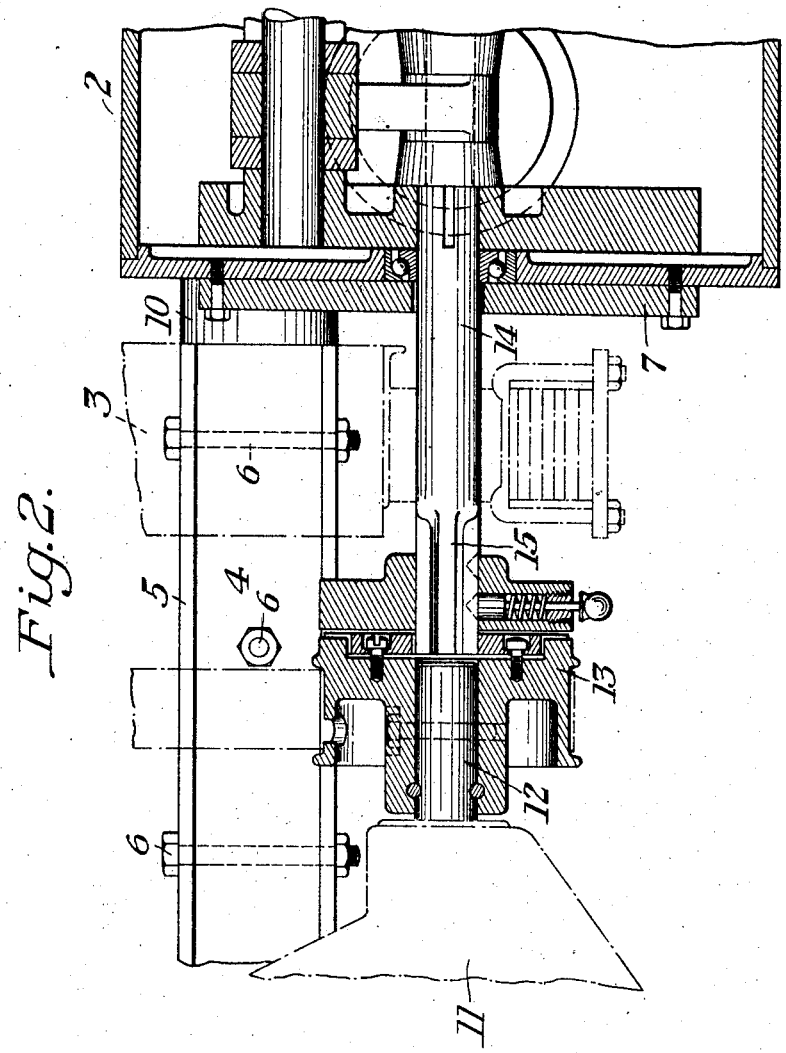

Patented July 19, 1927.

1,636,292

UNITED STATES PATENT OFFICE.

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR OF ALL HIS RIGHT TO THE DAVEY TREE EXPERT COMPANY, OF KENT, OHIO, A CORPORATION OF OHIO.

POWER-APPLIANCE ATTACHMENT FOR AUTOMOTIVE VEHICLES.

Original application filed March 31, 1924, Serial No. 703,098. Divided and this application filed July 17, 1926. Serial No. 123,198.

This invention relates to a connection for operatively attaching a power operated appliance to an automotive vehicle and is more particularly adapted for use with portable power operated appliances which are adapted to be moved from place to place with the automotive vehicle.

This application is a division of our copending application, Serial No. 703,098, filed March 31st, 1924.

An important object of this invention is the provision of means whereby a portable power driven appliance may be securely attached to an automotive vehicle and operatively connected to the engine of such vehicle.

A further object of this invention is the provision of a connection for operatively attaching a power operated appliance to an automotive vehicle having a pair of frame members and an engine, said connection including means for rigidly attaching the appliance to the frame members and a projecting shaft on the appliance for making a power connection with the engine when desired.

The invention will be described with particular reference to a portable air compressor, similar to that disclosed and claimed in the co-pending application aforesaid, but it is understood that the invention is not limited to such appliance and embodiment.

In the accompanying drawings there is illustrated certain preferred embodiments of our invention.

Figure 1 is a top plan view showing the appliance attached to an automobile.

Figure 2 is an enlarged sectional view showing the power connection to the appliance.

Figure 3 is a side elevation of a portion of the automobile frame with an attachment member in place.

Figure 4 is a sectional view on the line IV—IV of Figure 3, and

Figure 5 is a view similar to Figure 3 but illustrating a modified form of the attachment member.

Referring to Figure 1 there is shown an air compressor 2 connected to an automobile indicated generally at 3, by means of attachment members 4 secured to the automobile frame 5 by suitable bolts 6. In this embodiment the compressor 2 is provided with an attachment plate 7 which is bolted to the attachment members 4 by suitable nuts 8 engaging a threaded portion 9 extending from the forward end of the attachment member 4.

As shown in Figure 3 the attachment member 4 is provided with a collar 10 against which the attachment plate 7 is bolted. It will be noted that the collar 10 abuts the end of the frame 5 and acts as a spacer to hold the attachment plate in definite spaced relationship with the frame 5.

The frame 5 may be of the usual channel section (Fig. 4). The attachment member is shaped to fit snugly within the channel and closely engage the walls thereof. It will thus be seen that the attachment members 4 form a rigid extension of the frame 5. The bolts 6 extend through the web and flanges of the channel section and thereby insure rigidity in all directions, adjacent bolts preferably lying at a substantial angle to one another.

In Figure 2 there is shown an engine indicated generally by the numeral 11 having a shaft extension 12 which is commonly provided for cranking the engine. On account of the possibility of misalignment due not only to small variations in dimensions of either the vehicle or the compressor, but also due to the warping of the vehicle frame when the vehicle is standing on uneven ground, it is desirable to provide a flexible connection between the shaft 12 and the shaft of the power operated appliance, in this case, the air compressor. A connection of this type is illustrated generally by the numeral 13. This connection is described in detail in our co-pending application, Serial No. 703,098 and will not be described herein. It is obvious that any flexible connection which will transmit power between two shafts which are slightly out of alignment may be used. It is further desirable that the connection should afford means whereby the power operated appliance may be disconnected from the motor when it is not desired to operate the appliance.

It is frequently desirable to leave the compressor in place while the vehicle is being moved from one object to another and, if desired, the disk 20 may be made slidable on the shaft 14 and provided with a spring-pressed pin 22 for holding it in or out of engagement with coacting parts of the disk on shaft 12. It will be understood that the compressor is coupled or uncoupled only when at rest and for this purpose the pin will be found satisfactory, but other means are within the contemplation of our invention.

In order that the appliance may be connected and disconnected at will, we preferably provide a short extension shaft 14 having a splined end 15 lying adjacent the end of the motor shaft 12. The precise shape of the end of the shaft 14 will of course be determined by the type of connection used between the shaft 14 and the motor 11.

In Figure 5 we have illustrated a modified form of attachment member 4' bolted to a frame 5' by means of bolts 6'. The attachment member 4' is provided with an extension portion 16 having flanges 17 and 18 at the ends thereof. The flange 17 abuts the end of the frame 5', while the flange 18 is adapted to engage the appliance which may be bolted to the attachment member. As in the previously described embodiment, the attachment member 4' is provided with a threaded end portion 9' by which the appliance may be securely attached thereto. The extension portion 16 serves to space the appliance from the automotive vehicle to provide ample clearance for any type of flexible connection or clutch which may be employed between the appliance and the motor. It further insures ample clearance for any external fan which may be used to aid in cooling the motor 11.

The attachment members 4 and 4' are preferably made relatively long and have an extended area of contact with the frame of the vehicle. The provision of an extended contact between the attachment members and the frame insures a rigid connection and avoids concentrating the load on a small portion of the frame. Furthermore, ample space is provided for inserting bolts, through the attachment member and the web and flanges of the frame, without weakening the joint.

As hereinbefore stated this invention is not limited to a connection for an air compressor, but contemplates an improved means for operatively attaching any portable power operated appliance to an automotive vehicle.

The advantages of the present invention arise from the provision of a simple and effective means for rigidly securing a power operated appliance to the frame of an automotive vehicle. Further advantages accrue by reason of the provision of rigid attaching means from which the appliance may be quickly disconnected.

We further provide attaching means whereby a power operated appliance may be quickly and rigidly attached to the frame of an automotive vehicle and operatively connected with the engine of such vehicle.

While we have illustrated and described the present preferred embodiment of our invention, it will be understood that the invention is not limited thereto but may be otherwise embodied within the scope of the following claims.

We claim:

1. The combination of an automotive vehicle having an engine shaft and channeled frame members, a pair of bars fitting between vertically-spaced flanges of said frame members, means to prevent spreading of said flanges, a compressor supported solely by said bars close to the front of the vehicle, and means for driving the compressor from said engine shaft.

2. The combination of an automotive vehicle having an engine shaft and channeled frame members, a pair of bars fitting between vertically-spaced flanges of said frame members, bolts passing vertically through said flanges and bars to prevent spreading of the flanges, a compressor supported solely by said bars close to the front of the vehicle, and means for driving the compressor from said engine shaft.

3. The combination of an automotive vehicle having an engine shaft and channeled frame members, with means for supporting a sprung weight comprising a pair of bars having relatively long parts fitting between vertically-spaced flanges of said members and relatively short studs projecting beyond said frame members, integral collars on the bars back of said studs resting against the front ends of said frame members, a load-supporting plate with holes to receive said studs, and means on said studs for holding the plate in place against said collars.

4. The combination of an automotive vehicle having an engine shaft and channeled frame members, with means for supporting a load comprising a pair of bars having relatively long parts fitting between vertically-spaced flanges of said members and relatively short studs projecting beyond said frame members, an attachment plate on said studs, integral collars on the bars back of said studs of sufficient size to provide ample leverage area for the angular weight load transmitted to the supporting bars through the attachment plate, and a compressor detachably secured to said attachment plate close to the front of the vehicle.

5. The combination with an automotive vehicle having an engine shaft and channeled frame members, of a pair of bars fitting between the flanges of said channeled members and extending back a substantial distance between said flanges, an attachment plate extending across the front of the frame immediately adjacent to the ends of said channeled members and having openings to receive the ends of said bars, a power-operated appliance detachably secured to said plate in close proximity to the front of the vehicle, and means for driving said appliance from said engine shaft.

6. The combination with an automotive vehicle having an engine shaft and channeled frame members, of a pair of bars fitting between the flanges of said channeled members, an attachment plate on said bars close to the front of the vehicle, a power-operated machine detachably secured to said plate, and means for driving said machine from said engine shaft.

7. In combination with an automotive vehicle having channeled frame members and an engine shaft between them, supporting bars fitting in the channels of said frame members and secured thereto, a portable compressor supported solely by said bars close to the front end of the vehicle said compressor having a shaft alined with the engine shaft, and means for operably connecting said shafts.

8. In a combination with an automotive vehicle having an engine shaft and channeled frame members at opposite sides of said shaft, supporting bars extending a substantial distance into the channels of said frame members and fitting between the flanges thereof, means for securing the bars to said members, an attachment plate carried by said bars close to the front end of the vehicle, a portable compressor releasably secured to said plate, a compressor shaft in line with said engine shaft, and a clutch for operably connecting said shafts.

In testimony whereof we have hereunto set our hands.

JAMES A. DAVEY.
PAUL H. DAVEY.
CHARLES L. GAUGLER.